INVENTORS
MICHAEL D. PETROFF
STANLEY F. SWIADEK
BY
ATTORNEY

United States Patent Office 3,416,068
Patented Dec. 10, 1968

3,416,068
APPARATUS FOR DETECTING POWER RADIATED IN THE MICROWAVE-TO-OPTICAL FREQUENCY SPECTRUM
Michael D. Petroff, Los Angeles, and Stanley F. Swiadek, Pasadena, Calif., assignors to National Engineering Science Company, Pasadena, Calif., a corporation of California
Filed Apr. 18, 1966, Ser. No. 543,101
9 Claims. (Cl. 323—75)

ABSTRACT OF THE DISCLOSURE

A bolometer type of device for detecting and measuring power radiated, in a waveguide or otherwise, at frequencies ranging from microwave to optical, and wherein four wires are arranged to form a Wheatstone bridge circuit, two of the bridge wires being perpendicular to and insulated from the other two wires. This crossed arrangement of the wires makes the bridge insensitive to unpolarized light and thermal radiation, but extremely sensitive to polarized millimeter and microwave radiation.

---

Figure 1:
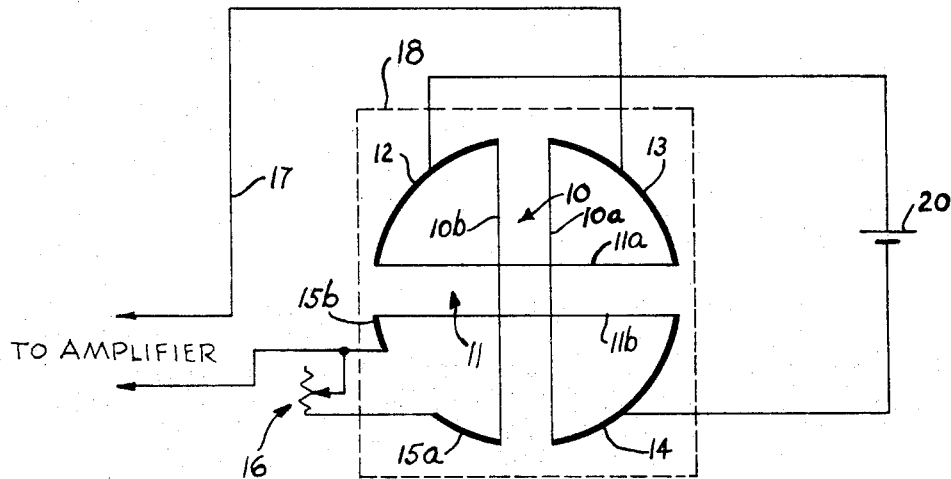

The present invention relates in general to the radiation-detector art and more particularly relates to apparatus for the detection and measurement of power radiated in a waveguide, or otherwise, at frequencies ranging from microwave to optical.

In order to provide a measure of the power propagated, for example, down a waveguide, it has been customary or usual in the art to mount a bolometer device inside the waveguide. As is well known, the bolometer is basically an electrical instrument for measuring minute quantities of radiant power by changes in resistance of a platinum strip exposed to the radiations. In using the bolometer, it is made one of arms of a four-terminal bridge circuit, and an indication of the amount of power propagated down the waveguide is obtained by balancing the bridge and thereafter noting the reading on the bridge scale which is suitably calibrated for this purpose.

Because the bolometer has proven to be a most convenient and practical means for power detection and measurement, the attempt has therefore been made to adapt it for use in the millimeter-wave range. However, because waveguides used in the millimeter-wave band are so very small as compared with those employed with lower frequency radiation, the S-band, for example, the attempt has been unsuccessful in that it has introduced a great many problems that appear to be insurmountable. More particularly, since a bolometer is a relatively expensive element, it is normally encapsulated for its protection. However, it has been found that it cannot be encapsulated in the millimeter-wave range simply because the internal dimensions of the guides are just too small to accommodate an encapsulated structure, with the result that it has been found necessary to mount the bolometer element in air inside the waveguide. Since the bolometer element is an extremely fine wire, the delicate nature of such a mounting and the problems attendant therewith will be readily recognized and appreciated. More specifically, due to vibrations or for other reasons, the bolometer element, in its unencapsulated state, is oftentimes damaged.

The problems mentioned are but a few of the difficulties encountered in attempting to adapt the bolometer to the millimeter-wave region and, as may be expected, there are still other disadvantages associated with its use.

One way in which such problems may be avoided is by means of the thermocouple type of apparatus taught in co-pending United States patent application, Ser. No. 454,396, entitled "Apparatus for Detecting Millimeter-Wave Power," filed May 10, 1965, by Petroff and Swiadek. As taught therein, the thermocouple apparatus basically comprises two sets of wires that are oriented orthogonally to each other and mounted outside of and to the rear of the waveguide system. The wires are contained in a vacuum tube, and each set consists of two wires made of dissimilar metal materials that heat up whereat millimeter-wave radiation is focused upon them. The wires in each set are mechanically and electrically joined to each other at one point, and when millimeter-wave energy is concentrated on this thermal-electric junction, and electrical current is produced whose magnitude corresponds to the average millimeter-wave power incident upon the wires in the area of their junction. Since the two sets of wires are orthogonal to one another, one set responds to one polarized component of the radiation out of the waveguide structure, whereas the other set responds to the orthogonally polarized component of the radiation. Thus, stated differently, the two orthogonally oriented sets of wires respectively respond or react only to those polarized components of the radiation that are likewise orthogonal to each other, with the result that such an apparatus may be used not only to provide an indication of total power, but may also be used to provide an indication of the power contained in each polarized component, as well as the type of polarization involved, such as circular, elliptical, etc.

The present invention, in terms of simplicity of construction and sensitivity to millimeter-wave power, constitutes a marked improvement over the above-mentioned thermocouple device. More specifically, in the present invention the wires are arranged to form a Wheatstone bridge circuit, with the wires forming opposite legs of the bridge being mounted parallel to one another and with the adjacent wire elements being mounted perpendicular to one another. Stated differently, as in the thermocouple device, an embodiment of the present invention comprises two sets of wires having two wires in each set, the wires in one set being parallel to each other and perpendicular to the wires of the other set. In addition, the two sets of wires respectively form the opposite sides of the Wheatstone bridge circuit. The crossed arrangement of the wires makes the bridge insensitive to unpolarized light and thermal radiation, but extremely sensitive to polarized millimeter- and micro-wave radiation. By way of example of the kind of sensitivity involved, it has been found that embodiments of the present invention can detect down to $10^{-11}$ watts of observed power. Aside from the fact that all elements of the bridge circuit are bolometer wires which are exposed to the same thermal environment, thereby greatly reducing long-term drift, it should also be mentioned that the wire elements used herein are considerably longer than typical bolometer wires, the use of long elements reducing end effects and allowing almost the entire wire to operate at optimum conditions.

Accordingly, it is an object of the present invention to provide an improved bolometer apparatus.

It is another object of the present invention to provide bolometer apparatus for the detection and measurement of millimeter-wave power, as well as power at other wavelengths.

It is a further object of the present invention to provide bolometer apparatus that need not be mounted inside a waveguide to detect and measure the power propagated therealong.

It is an additional object of the present invention to provide a relatively simple bolometer device that is nevertheless extremely sensitive to the presence of millimeter-wave radiation.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is expressly understood, however, that the drawing is for the purpose of illustration and description only, and is not intended as a definition of the limits of the invention.

Figure 2:
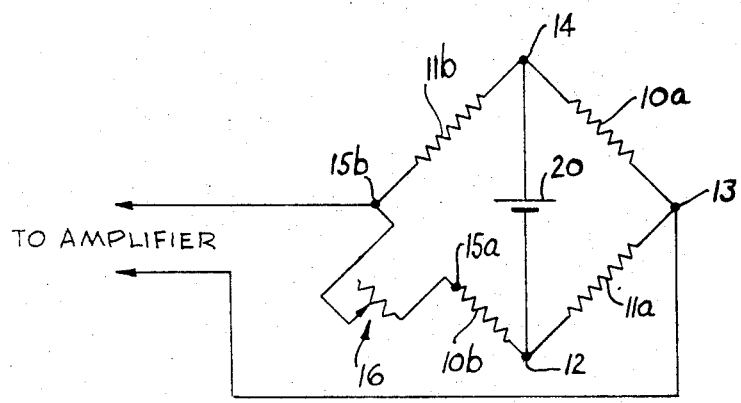

FIGURE 1 illustrates the arrangement of the wires and the mounting thereof in a preferred embodiment of the present invention; and FIGURE 2 presents a schematic of a Wheatstone bridge circuit which, as will be seen below, is the equivalent circuit for the FIG. 1 embodiment.

For a consideration of the invention in detail, reference is now made to the drawing wherein like or equivalent elements of the embodiment illustrated therein are given the same designations in both figures. In FIG. 1, the embodiment is shown to include two sets of wires respectively and generally designated as 10 and 11. As shown in the figure, set 10 is oriented orthogonally to set 11, that is to say, the two sets of wires cross each other at right angles, and each set comprises two wires, the wires in set 10 being designated 10a and 10b, and the wires in set 11 being designated 11a and 11b. In each set, the wires are spaced apart and parallel to one another, so that wires 10a and 10b are spaced from and parallel to each other and, likewise, wires 11a and 11b are spaced from and parallel to each other. On the other hand, wires 10a and 10b are positioned perpendicularly to wires 11a and 11b, as was previously mentioned, the wires of set 10 also being spaced or insulated from the wires of set 11. More specifically, it can be said that wires 10 and 11 respectively lie in two planes that are, like the wires in each set, spaced from and parallel to each other. All four wires are preferably made of the same material, the material being of a kind such that the resistance of each wire will change according to the amount of millimeter-wave powed absorbed by it. Platinum and an alloy of ninety percent platinum and ten percent rhodium are examples of metal materials out of which the wires can be made. Finally, the thickness or diameter of the wires is quite small, in the order of a micron or two, generally speaking.

The wires are electrically connected to a plurality of four metal terminals which, because the wires are so thin, also provide the necessary mechanical support for them. In the figure, three of the terminals are respectively designated 12, 13 and 14. The fourth terminal, however, is broken into two parts that are respectively designated 15a and 15b. Considering the connections, wire 10a is connected between terminals 13 and 14, whereas wire 10b is connected between terminal 12 and terminal segment 15a. Similarly, wire 11a is connected between terminals 12 and 13, while wire 11b is connected between terminal 14 and terminal segment 15b. As may be seen from the figure and for reasons that will be mentioned later, a potentiometer 16 is electrically connected between terminal segments 15a and 15b. The bridge output is taken between terminals 13 and 15b and may be fed directly to a meter device or to an amplifier beforehand.

For practical reasons, the described apparatus would be mounted in an evacuated glass envelope or tube that is represented in FIG. 1 by the broken-line envelope 18. However, in order to permit its adjustment, the potentiometer is obviously located outside the tube but is connected to the terminal segments inside, the connections being made through the tube in an air-tight manner. The same may be said for the terminal wires, leads or pins by means of which external connection to the apparatus is made. In this regard, FIG. 1 shows an external source of DC voltage 20, such as a battery, connected between terminals 12 and 14. An evacuated glass envelope of the kind that can be adapted for use in the present invention is shown and described in United States Patent No. 1,944,- 194 entitled "Radiant Energy Detector" by William Sackville, issued Jan. 23, 1934.

Notwithstanding the manner in which they are physically mounted and oriented, wires 10 and 11 are connected electrically to form a Wheatstone-bridge ciruit for which a schematic equivalent is shown in FIG. 2. As may be seen from this figure, the bridge circuit basically comprises four resistance elements, wires 10a and 10b, forming one pair of opposite arms of the bridge, being two of these elements, and wires 11a and 11b, forming the other pair of opposite arms of the bridge, being the remaining two elements. As previously indicated, a significant feature is that opposite elements of the bridge are parallel in space and adjacent legs are perpendicular. Potentiometer 16 is connected in series with one of the wires, namely, wire 10b, and is used to initially balance the bridge circuit.

Considering now its operation, the bridge circuit is first balanced so that the voltage between terminals 13 and 15b will initially be zero. Wheatstone bridges are well known, and the manner of and reason for balancing them at the outset are equally well known. In the present case, the balance is achieved by adjusting the resistance of potentiometer 16 until the meter to which the bridge circuit is ultimately coupled reads zero. Once this balance is obtained, the apparatus is ready to be used for its intended purpose, namely, the detection and measurement of millimeter-wave power. Toward this end, the apparatus, which is in essence a bolometer, is mounted to receive millimeter-wave power as, for example, by mounting it to the rear of a millimeter-wave waveguide structure.

Before any further consideration of the operation, it will be assumed that the millimeter-wave radiation out of the waveguide consists of two synchronized plane-polarized waves for which the electric vectors are mutually perpendicular, as would be the case, for example, where elliptically polarized radiation is propagated. Assuming elliptically polarized radiation for sake of this discussion, wires 10a and 10b respond to one of the two polarized waves and wires 11a and 11b respond to the other of the polarized waves to cause a bridge imbalance that results in the development of an output signal. More specifically, wires 10a and 10b absorb power from the wave whose electric vector is oriented in the same direction as these wires, and for the same reason wires 11a and 11b absorb power from the other wave. The absorption of this power causes the temperature of these wires to rise and this, in turn, produces corresponding changes in their resistance values, thereby unbalancing the bridge, as previously mentioned. The extent of the unbalance, as determined by the output signal, is an indication or measure of the difference in the power absorbed by the two sets of wires and, therefore, an indication or measure of the difference in magnitude between the two cross-polarized waves propagated down the waveguide. If a galvanometer type of meter device is employed, the meter will merely provide a qualitative indication, whereas if a voltmeter type of device is used that is properly scaled, then the meter reading will provide a direct measurement of the aforesaid difference in power.

On the other hand, if only a single plane-polarized wave is involved wherein the electric vector is oriented in the direction of one of the two sets of wires, the power is absorbed solely by that set of wires, and the bridge unbalance is then a direct measure of the total power propagated down the waveguide.

Having thus described the invention, it should be mentioned that apparatus of the present invention is insensitive to ambient temperature changes, the reason being that unpolarized ambient radiation, which is always present, will heat all wires equally and, therefore, will null or cancel out. It should also be mentioned once again that the present invention is not limited to the millimeter-wave region but, rather, is effective in the microwave and optical regions as well. In short, embodiments of the present invention are operable at frequencies ranging from the microwave to the optical, but with optimum sensitivity occurring in the millimeter-wave region. Stated differently, the present invention has already been used to detect power at wavelengths up to 10 centimeters and down to less than 1 micron. For example, the output of a helium-neon laser at 0.73 micron has been detected.

Finally, although a particular arrangement of the invention has been illustrated and described above by way of example, it is not intended that the invention be limited thereto. Rather, the invention should be considered to include any and all modifications, alterations or equivalent arrangements falling within the scope of the annexed claims.

What is claimed is:

1. Bolometer apparatus for detecting power radiated at wavelengths ranging from microwave to optical, said apparatus comprising: a Wheatstone-bridge circuit in which the elements forming the bridge arms of the circuit are wires whose resistance changes according to the amount of power respectively absorbed by them, said bridge arms being arranged so as to be responsive to the polarization of the detected wave.

2. Bolometer apparatus for detecting power radiated at wavelengths ranging from microwave to optical, said apparatus comprising: a Wheatstone-bridge circuit in which two of the four elements forming the bridge circuit are wires whose resistance changes according to the amount of power respectively absorbed by them, said two wires being mounted and oriented to primarily absorb power that is polarized in a first direction.

3. The apparatus defined in claim 2 wherein said two wires are mounted as opposite arms of the bridge circuit and spatially parallel to each other.

4. The apparatus defined in claim 2 wherein the remaining two of the four elements forming the bridge are also wires whose resistance changes according to the amount of power respectively absorbed by them, said additional two wires being mounted and oriented to primarily absorb power that is polarized in a second direction that is perpendicular to said first direction.

5. The apparatus defined in claim 4 wherein said two additional wires are mounted as the two remaining opposite arms of the bridge circuit, and also spatially parallel to each other.

6. The apparatus defined in claim 5 wherein said additional pair of wires are mounted orthogonally to said first pair of wires.

7. The apparatus defined in claim 5 wherein said wires include platinum.

8. The apparatus defined in claim 6 wherein said two pairs of wires lie in parallel planes.

9. The apparatus defined in claim 8 wherein said apparatus further includes an evacuated envelope having a face plate that is transparent to the radiation, said bridge circuit being mounted within said envelope with the planes of the wires thereof substantially parallel to the face plate.

References Cited

UNITED STATES PATENTS

| | | | |
|---|---|---|---|
| 1,099,199 | 6/1914 | Parker | 73—355 |
| 1,944,194 | 1/1934 | Sackville | 338—17 |
| 2,611,795 | 9/1952 | Carlin | 324—98 |
| 2,921,262 | 1/1960 | Jaffe | 324—95 |
| 2,981,913 | 4/1961 | Barnes et al. | 338—18 |
| 2,991,417 | 7/1961 | Papp | 324—95 |
| 3,114,104 | 12/1963 | Fleming | 324—95 |

MILTON O. HIRSHFIELD, *Primary Examiner.*

WARREN E. RAY, *Assistant Examiner.*

U.S. Cl. X.R.

73—355; 250—83.3; 324—95